United States Patent [19]

Bram

[11] 4,027,904

[45] June 7, 1977

[54] DEVICE FOR A TENSILE LOCKING OF PIPE ELEMENTS

[75] Inventor: Georges Eugéne Bram, Pont-a-Mousson, France

[73] Assignee: Pont-A-Mousson S.A., Nancy, France

[22] Filed: Jan. 29, 1976

[21] Appl. No.: 653,567

[30] Foreign Application Priority Data

Mar. 14, 1975 France .................. 75.07989

[52] U.S. Cl. .................. 285/297; 285/374
[51] Int. Cl.$^2$ .................. F16L 21/08
[58] Field of Search .......... 285/296, 295, 294, 374, 285/54, 297, 53

[56] References Cited

UNITED STATES PATENTS

| | | | |
|---|---|---|---|
| 763,542 | 6/1904 | Crawford et al. | 285/54 |
| 1,588,444 | 6/1926 | Carson | 285/374 |
| 1,805,962 | 5/1931 | Thomas | 285/374 X |
| 2,576,012 | 11/1951 | Gurck | 285/288 |
| 3,432,186 | 3/1969 | Braun | 285/53 |
| 3,684,320 | 8/1972 | Platzer et al. | 285/374 X |

FOREIGN PATENTS OR APPLICATIONS

| 2,251,082 | 5/1973 | Germany | 285/374 |
|---|---|---|---|

Primary Examiner—Thomas F. Callaghan
Attorney, Agent, or Firm—Sughrue, Rothwell, Mion, Zinn & Macpeak

[57] ABSTRACT

A coupling in which a male end of a pipe element is inserted in the socket of a second pipe element and the axes of the pipe elements may have an angular deviation therebetween. An abutment projection on the male end is axially supported by an inner shoulder on the socket through a ring, bearing against the projection on the side of the latter adjacent the shoulder, and a mass of hardenable material disposed around the projection and the ring between the sealing element of the coupling and the shoulder.

In the case where the shoulder of the socket defines a large radial clearance between itself and the male end, an intermediate tensile locking means is interposed, in the axial direction, between the hardenable material and the shoulder and, in the radial direction, between the male end and the socket, the outside diameter of this means having, with respect to the inside diameter of the socket, axially inwardly of the shoulder, sufficient clearance to allow the angular deviations of the pipe elements.

10 Claims, 11 Drawing Figures

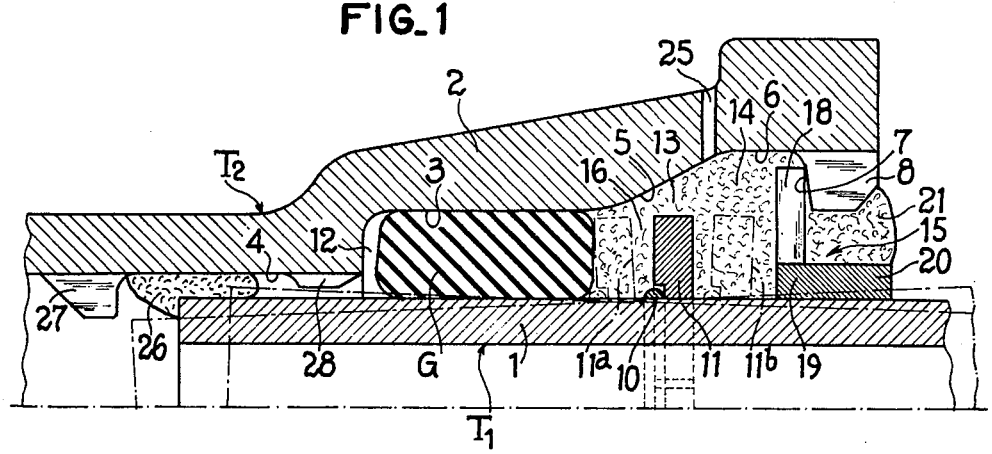
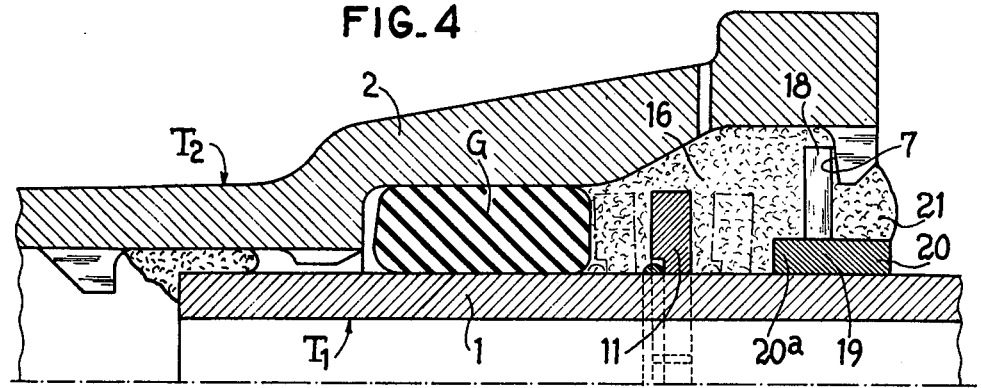
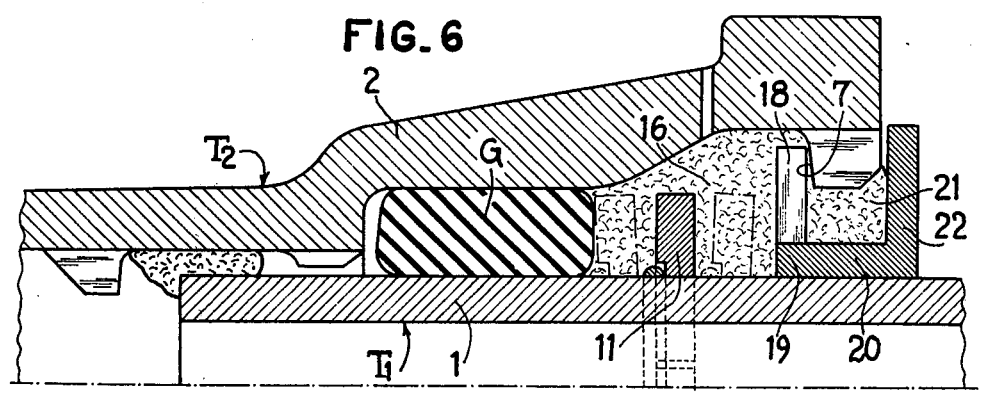

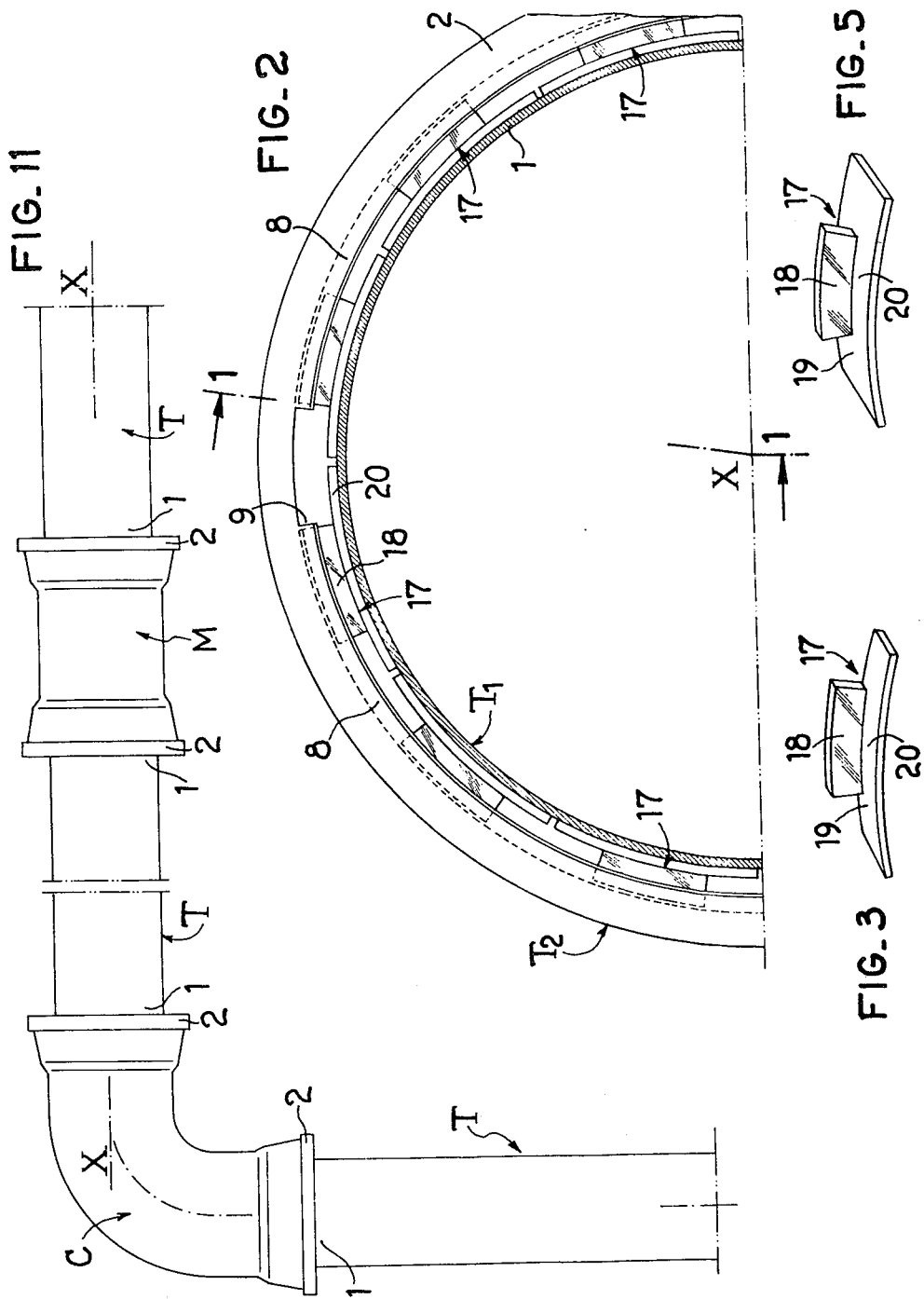

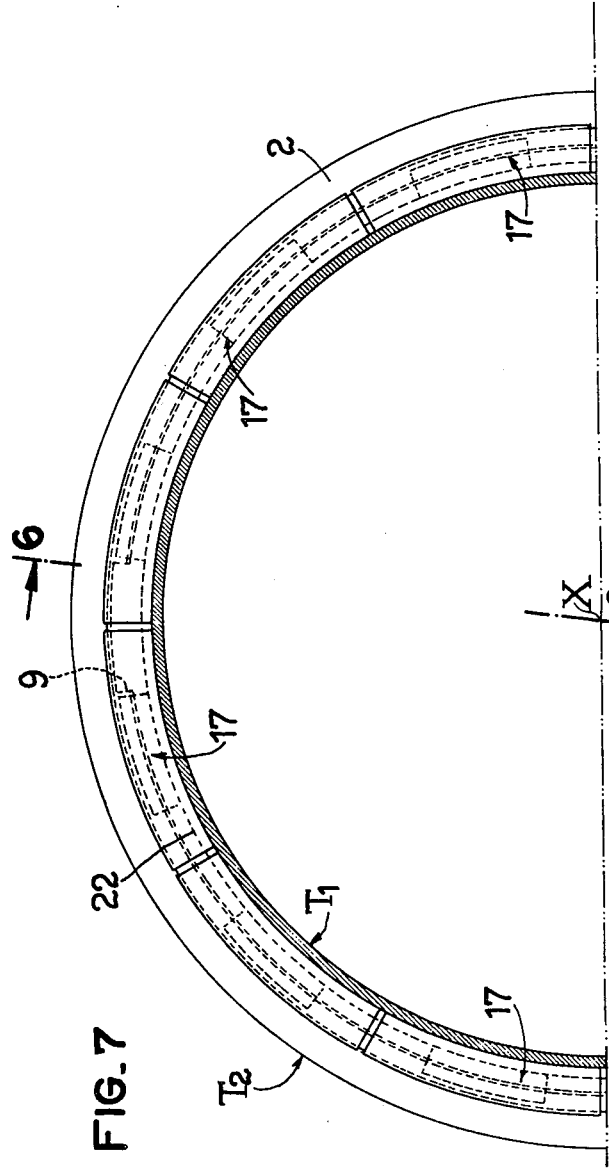
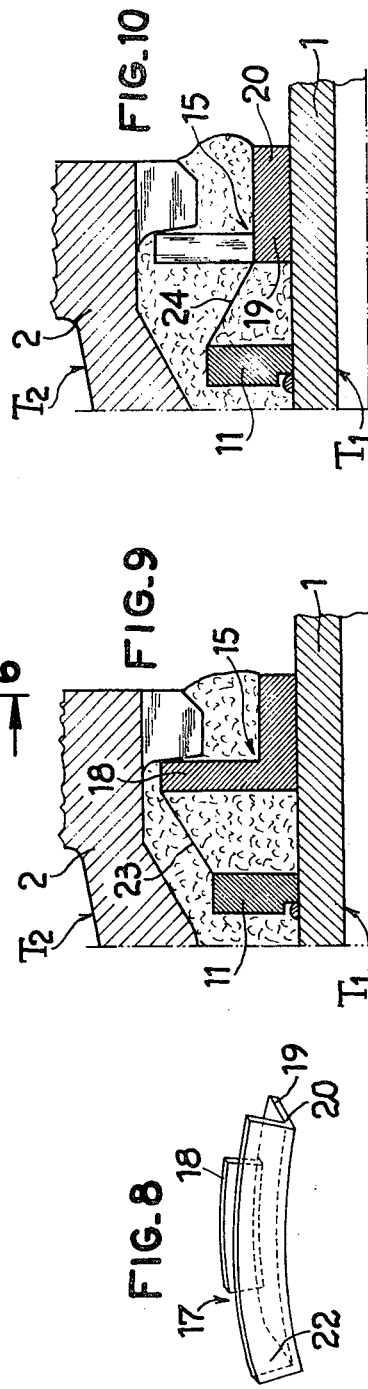

DEVICE FOR A TENSILE LOCKING OF PIPE ELEMENTS

The present invention relates to tensile locking devices for a coupling between two pipe elements which may have an angular deviation between their axes, in which one of the pipe elements has a male end or spigot and the other has a socket, the male end being in an inserted position in the socket with interposition of a sealing element, and an abutment projection, integral with the outer surface of the male end, is supported by a shoulder defined by the inner surface of the socket, with interposition of a ring which bears against a side of the abutment projection adjacent the shoulder, and a mass of hardenable material which is disposed in the whole of a space which remains empty between the socket and the male end around the abutment projection and the ring.

Such a device is for example described in French Pat. No. 71 39 488 (2 159 581).

Now, there are cases where the shoulder does not extend radially far enough toward the axis of the pipe to enable the hardened mass to obtain a large enough support to allow it to work essentially under compression between the ring blocked by the abutment projection and the shoulder, the hardened mass then working rather under shear stress. Such a configuration would occur, for example, if it were desired to apply the aforementioned device, without adapting it, to joints having a socket in which a sealing element of the radial compression type is urged back into a definitive hoiusing therefor between the male end and the socket, from a first entrance chamber which would then constitute the second socket. Such a joint is, for example, illustrated in FIG. 3 of French Pat. No. 70 22 036 (2 094 278). In this Figure, the entrance of the socket allows a very large annular free passage for an apparatus which serves to push the sealing element into its final housing or cavity, with this entrance of the socket having only a few inner radial lugs of small radial dimension which allows the bayonet-type hooking of a ring adapted to maintain the sealing element in position against forces of expulsion produced by the internal pressure when the pipe is in use.

Thus the present invention has for object to adapt the aforementioned device to couplings in which the shoulder of the second socket provides a large radial clearance between itself and the male end.

According to the invention, there is provided a device of this type, wherein an intermediate tensile locking means is interposed, axially, between the hardenable material and the shoulder and, radially, between the male end and the socket, the outside diameter of said intermediate means having, with respect to the inside diameter of the socket, axially inward of the shoulder, sufficient clearance to allow the angular deviations of the pipe elements.

Thus, this intermediate means, in at least partially closing the entrance of the socket, allows a suitable transmission of the forces when the coupling is put under tensile strain between the mass of the hardenable material and the shoulder.

In a particularly advantageous embodiment, the shoulder has a recess and the intermediate means has at least one circumferential and radial strip whose circumferential dimension is less than that of said recess and bears against the shoulder outside the recess.

This arrangement permits a particularly easy assembly of the locking device by a bayonet-type engagement of the strip behind the shoulder.

It is advantageously arranged that the intermediate means have a plurality of strips and that the radially inner edge of each strip be integral with a sector of a ring having a circumferential dimension larger than that of the strip, the assembly of the ring sectors occupying the whole of the circumference. This arrangement ensures a good circumferential distribution of the action of the locking device. The circumferential dimension of the ring sector is advantageously double that of the strip.

Although it is possible to produce all the ring sectors in a single piece, in the form of a closed continuous ring, which is of interest when the pipe elements to be coupled and locked together have a relatively small diameter (this arrangement requiring obviously as many recesses in the shoulder as there are strips on the ring), it is preferably arranged for the purpose of facilitating manufacture and positioning (in particular in the case of large diameter pipe elements) that the ring sectors be distinct but always adjoining, so that the assembly occupies the whole of the circumference. In both cases, the circumferential continuity of the locking device is ensured.

Also, preferably, the radially inner edge of the strip, or each strip, is integral with a circumferential and axial web which bears against the male end. This arrangement avoids any tipping of the strip, during the assembly, before the mass of hardenable material has been introduced and also, after assembly, under the effect of the pressure exerted by the internal pressure of the fluid flowing in the pipe.

The web may extend at least outwardly of the socket, with the radial dimension of its outer part being substantially less than the inside diameter of the shoulder. The radial section of the intermediate means then has an inverted T-shaped or L-shaped configuration. A second radial strip integral with the outer end of the web and parallel to the first strip may also be provided at an axial distance from the first strip equal to the thickness of the shoulder. The radial section of the intermediate means then has a U-shaped configuration.

In these different cases, where the radial section of the intermediate means has an L-, inverted T-, or U-shaped configuration, it has been found advantageous to arrange that the mass of hardenable material spread beyond the strip or strips outside the socket at least in the region of the shoulder between the latter and the outer part of the web or webs. This additional material, when hardened, participates in the holding in position of the intermediate means with no tipping or bending of the radial strip or strips, notwithstanding the thrust exerted by the pressure within the pipe. This additional material, when hardened, also increases the resistance to possible angular displacements of the two pipe elements with respect to each other, which could be caused by movements of the ground around the pipe.

In order to still further increase its resistance to possible angular displacements, another mass of hardenable material may be disposed at the extreme end of the male end between the latter and the inner wall of the second pipe element.

Further features and advantages of the invention will be apparent from the ensuing description, with reference to the accompanying drawings, of embodiments to which the invention is not intended to be limited.

In the drawings:

FIG. 1 is a partial axial sectional view, taken on line 1—1 of FIG. 2, of a coupling provided with a device according to the invention with an L-section intermediate means;

FIG. 2 is an elevational view of the right end of the coupling shown in FIG. 1, before the hardenable material has been inserted;

FIG. 3 is a perspective view of one of the elements of the intermediate means shown in FIGS. 1 and 2;

FIG. 4 is a view similar to FIG. 1, with an intermediate means having an inverted T-section;

FIG. 5 is a perspective view of one of the elements of the intermediate means shown in FIG. 4;

FIG. 6 is another view similar to FIG. 1, with an intermediate means having a U-section, taken on line 6—6 of FIG. 7;

FIG. 7 is a half-elevational view of the right end of the coupling shown in FIG. 6, before the hardenable material has been inserted;

FIG. 8 is a perspective view of one of the elements of the intermediate means shown in FIGS. 6 and 7;

FIG. 9 illustrates the manner in which the axial locking thrust is exerted against an element of the intermediate means shown in FIGS. 1-3 in the region of a radial strip;

FIG. 10 illustrates how the same thrust is exerted in the gap between two strips on the ring sector, and FIG. 11 is a side elevational view of a pipe having couplings according to the invention.

The various couplings or joints shown in the drawings are between two pipe elements, one element $T_1$ having a smooth male end or spigot and the other element $T_2$ having a socket. These elements have a common axis X—X. In the ensuing description the term "upstream" is intended to correspond to the right part of the axial sectional views, that is to say, in the direction of the open end of the socket, and "downstream" intends to mean the left part of the view of the coupling, that is to say toward the extremity of the male end, with these terms referring to the direction of introduction of the male end in the socket.

These couplings or joints are of the "radial compression" type in which the sealing is achieved by a radial pinching or compression of an annular sealing element G, for example of rubber, between the male end 1 and a cylindrical surface 3 of the socket 2 which has an inside diameter larger than the diameter of the socket part 4 which surrounds the end of the male end but less than the outside diameter of the sealing element G in the free state before it is compressed.

In the upstream direction, the socket 2 has, following on the part 4 and the cylindrical surface 3, a cylindrical surface 6 and a radial shoulder 7 defined by an inner flange 8 which radially partly closes the free space between the socket and a male end and which defines, circumferentially, at least one recess 9 which extends throughout the radial dimension of the flange 8.

The male end 1 carries, upstream of its zone of contact with the sealing element G, a radial and annular abutment projection 10 which may be formed by a weld bead. As taught in French Pat. No. 71 39 488, an abutment or stop ring 11 is applied against this projection 10 on the side of the projection adjacent the shoulder 7. This ring may or may not be split and elastic, but it is nearly always split for two reasons. The first reason is that, when split, the ring may be introduced and placed in position on the male end after the weld bead has been deposited and the rings may be transported separately without having to mount them in the factory. The second reason concerns the manufacturing tolerances, since the weld bead is not very high (in the radial direction) and therefore could — in the case of a closed ring which is slightly large and a male end which is slightly small — pass through this ring without retaining it. Therefore it is usually better to arrange that the ring be split and elastic but a closed ring must not be excluded in particular for small diameters.

Moreover, note that, bearing in mind its small height and its small width, the projection 10 opposes no resistance to the positioning of the sealing element G in the cavity 12 defined by the surface 3 and constituting its final housing, from the cavity 13, defined by the surface 5 and constituting its temporary waiting housing, under the thrust of a suitable apparatus. This positioning of the sealing element is indeed similar to a flow and the projection 10 merely creates a slight pressure drop that the sealing element G easily absorbs.

The positions in dotted line $11^a$ and $11^b$ of the split ring are the extreme positions of the latter and the projection 10 against which it is applied for extreme angular deviations between the axes of the elements $T_1$ and $T_2$. The distance in the drawing of these positions from the median position, which is that of aligned pipe elements, should not cause surprise, since, for an angle between the axes of 3° in respect of pipe elements having a diameter of 1.6 meters, the axial offset is as much as 2.8 cm.

There is disposed against the shoulder 7 inside the cavity 14 defined by the surface 6, an intermediate means or structure designated generally by the reference number 18 which partly provides a support for a mass of hardenable material 16 introduced in the whole of the cavity of the socket 2 supstream of the sealing element G.

This intermediate means 15 comprises a plurality of elements 17 each having a radially and circumferentially extending strip 18 which extends from a sector of a ring 19 provided in the upstream direction with an extension or web 20 in the form of a cylindrical sector. This web 20, in combination with an overflow of the hardenable material 15 in the direction of the end of the socket in the region 21, creates a resistance to a bending of the strips 18 under the effect of the thrust, exerted by the internal pressure of the fluid flowing in the pipe elements, through the sealing element G and the hardenable mass 16.

The radial dimension or thickness of the ring sector 19 and the cylindrical web 20 is small. The sector and the web can therefore be slid between the flange 8 and the male end 1 in all the conditions of angular deviation allowed by the coupling.

The strips 18 have such radial dimension that the outside diameter of the intermediate means 15, constituted by the strips 18, has, with respect to the inside diameter of the cavity 13, sufficient clearance to allow all the envisaged angular deviations while being as near as possible to the surface 6.

They thus suitably bear behind the shoulder 7. In the circumferential direction these strips 18 have a dimension slightly less than that of the recess 9 formed in the flange 8. Various combinations of the number of recesses and strips 8 and their circumferential dimension may be envisaged, whether the latter be common to the recesses or to the strips or smaller for the strips than for the recesses. However, it is of course intended, on one hand, to distribute the strips over the whole of the periphery of the coupling and, on the other hand, to give them on the whole a maximum circumferential extent, bearing in mind that bayonet-type of assembly.

If it is decided to form the intermediate means 15 in one piece, as many recesses 9 would of course be required as there are strips 18. The assembly of the strips could have a circumferential extent which is one half of the circumference. Preferably they would be arranged symmetrically on the periphery, for example twelve in number and correspond to twelve recesses.

In the embodiment shown in the drawings, the intermediate means 15 is divided into distinct elements 17 and each of these elements may have one or more strips 18, with the latter occupying at the most one half of the circumferential dimension of the element, that is, of the ring 19 and web 20. In this case, there could be only a number of recesses corresponding to the number of strips per element. However, for convenience of assembly, the number of recesses may be multiplied so as to avoid having to turn the elements through half a rotation when assembling the coupling.

The ring 19 located at the inner end of the strips 18 is extended by the cylindrical web 20 in the upstream direction and there is provided, in the embodiment shown in FIGS. 6 and 7, at the upstream end of this web a second strip 22 which also projects radially and is parallel to the strips 18. The gap between the two strips 18 and 22 is slightly greater than the axial thickness of the flange 8. Moreover, the circumferential dimension of the strips 22 is equal to that of the ring 19 and web 20, the strips being thus assembled without a gap throughout the periphery of the coupling, with the elements in adjoining relation to each other if the intermediate means 16 is not in a single piece.

To summarize, depending on the position of the strips 18 and webs 20 and on whether second strips 22 are or are not provided, the intermediate means 16 has a cross-sectional shape, that is to say a shape in an axial section of the coupling, in the form of an L or inverted T (in this case with a heel $20^a$ extending in the downstream direction as shown in FIG. 4) or, in the form of a U (as shown in FIGS. 6 and 8).

The U-section is particularly advantageous bearing in mind the function performed by the various parts in the locking, which will be described now with reference to FIGS. 9 and 10.

The intermediate means 15 could also have a section in the form of an inclined F, that is to say, in the form of a U with a heel extending in the upstream direction.

FIG. 9 illustrates the transmission of the locking force between the ring 11 and the intermediate means 15 in the region of a radial strip 18. This transmission occurs inside a sector of a truncated cone which is divergent in the outward direction between the radially outer edges of the ring 11 and strips 18, this cone being defined by a surface 23. FIGS. 10 shows the same transmission in the gap between the ring 11 and the ring sectors 19 of the elements of the intermediate means 15 in the region where these elements are reduced to ring sectors and webs 20. The sector of a truncated cone of transmission, defined by a surface 24, is then convergent in the outward direction.

In the case where no extensions 20 are provided for the ring sectors 19, it might be feared that the thrust exerted by the locking force on the strips 18 tip or bend these strips in the region of the shoulder 7. The web 20 increases the inertia of the intermediate means and opposes this movement. Moreover, if the precaution is taken of making the hardenable mass overflow slightly at 21, outside the strips 18 under the flange 8, a hardened mass is obtained whose strength under compressive stress between the web 20 and the flange participates in the resistance to this tipping or bending of the strips 18.

The U-shaped section shown in FIGS. 6 and 8 is then particularly advantageous, since it offers a closed cavity for this work under compression of the hardened mass 21.

This section is also advantageous in that it provides a guiding during the positioning of the intermediate means which is particularly appreciable when this means is constructed in the form of discontinuous elements. The second strips 22 of the U-shaped section help to ensure that the hardenable mass does not flow outwardly with no need to form a sort of temporary coffering for this purpose during the setting time.

This hardenable mass 16 is inserted, and it overflows to the region 21, by pouring it through an aperture 25 formed in the socket 2 upstream of the sealing element G in the region of the connection between the surfaces 5 and 6, with perhaps a second aperture which performs the function of venting.

The additional amount 21 of hardened mass reinforces the resistance that the mass 16 itself provides already to possible subsequent angular displacement under the effect of movement of the ground surrounding the pipe. For the purpose of reinforcing the stiffening action of the hardened mass 16 and of its additional amount at 21, another mass of hardenable material may also be provided at 26 at the downstream end of the male end of the pipe $T_1$. This additional hardenable mass may be placed with a trowel from within the pipe as pipe assembly proceeds, bearing in mind the large inside diameter of the pipe. Note that downstream of this end of the male end, the socket 2 has inner lugs 27 adapted to act as an axial abutment in the case of compression of the pipe elements. Upstream of the mass 26, the socket 2 has other lugs 28 of shorter radial extent adapted to limit the possible angular deviations allowed by the coupling.

The present invention constitutes a very appreciable progress for the essential reason that the elbows or T-couplings of pipes which are the origin of axial thrusts on the pipe elements which require the tensile locking are usually incompatible with the presence of a flange 8 which has a large inward projection at the entrance of their socket. Indeed, in the absence of an easy grip on these elbows or T-couplings it will be difficult to maintain them equipped with the element G while the male end is introduced by an axial thrust in opposition to the resistance to this introduction offered by the sealing element G. The definitive positioning of the sealing element G prior to the introduction of the male end 1 in the socket 2 is therefore in practice required for these non-rectilinear parts. The free passage of the apparatus intended to urge this sealing element G into the socket 2 then requires that the flange 8 does not extend excessively inwardly into the cavity 14.

The invention, which is well adapted to the locking of a male end in a socket closed by a very small shoulder, is therefore particularly suitable for the locking of the first male end adjacent to a coupling or an elbow, such as the elbows C shown in FIG. 11. The interest of this is that the same type of locking may be extruded to the following rectilinear coupling, which represents a further advantage. Indeed, in a straight line of pipe elements, in which the locking is unnecessary, there is no need to form in the socket of female pipes other cavities than that for the sealing element G. Under these conditions when, according to the French Pat. No. 71 39 488, it was arranged to lock the coupling between two straight pipes, it was then necessary to extend the socket in order to house the locking element therein. It was necessary to have two pipes of straight type: those having merely the socket necessary for the coupling proper and those provided with in addition a second socket for locking purposes. Owing to the invention, this requirement is avoided, since, whatever are the couplings required to be locked, there may be employed, on each side of couplings or elbows instead of pipes having a male end and a socket, pipes T having two male ends and sleeves M having two sockets. The situation is then as in the preceding case of a locking between a male end and a coupling in general. It should be mentioned that these sleeves moreover require no special manufacture for the locking since their manufacture is in any case required for many other reasons.

Having now described my invention what I claim as new and desire to secure by Letters Patent is:

1. In a device for the tensile locking of a coupling between a first pipe element having a male end portion and a second pipe element having a socket portion, the male end portion being in an inserted position in the socket portion with interposition of an elastic sealing element, the device comprising an outer abutment projection integral with the male end portion, an inner flange integral with the socket portion and defining an inner shoulder facing axially inwardly of the socket portion and axially spaced from the abutment projection, the socket portion and flange defining with the male end portion a clearance exceeding a clearance for ease of axial assembly so that the pipe elements are able to be assembled at a given angular offset from axial alignment of the pipe elements, a ring located axially between the abutment projection and the flange and axially bearing against the abutment projection and a mass of hardenable material which is in the hardened state and disposed in the whole of a space which is empty between the male end portion and the socket portion and around the abutment projection and the ring, the elastic sealing element being located axially inwardly of the mass of hardenable material and the hardenable material being capable in its hardened state of rigidly resisting extraction of the male end portion from the socket portion; the improvement comprising in combination with the hardenable material and the flange an intermediate tensile locking means axially interposed between the hardenable material and the inner shoulder of the flange and radially overlapping the shoulder and radially extending to the male end portion, the intermediate means radially defining with the socket portion and with the flange sufficient annular clearance to allow said angular offset upon assembly of the two pipe elements.

2. The device claimed in claim 1, wherein the flange defines a recess and the intermediate means has at least one circumferentially and radially extending strip which has a circumferential extent less than that of said recess and bears axially against the shoulder.

3. The device claimed in claim 1, wherein the flange defines a recess and the intermediate means comprises a plurality of circumferentially and radially extending strips, each strip having a radially inner edge, and a ring sector having a greater circumferential extent than the strip and being integral with each strip, the ring sectors when assembled occupying a complete circumference around the male end portion.

4. The device claimed in claim 3, wherein the ring sectors are distinct and in adjoining relation in the circumferential direction.

5. The device claimed in claim 2, wherein the strip has a radially inner edge and a circumferentially and axially extending web which bears against the male end portion is integral with said inner edge and extends from a side of the strip adjacent the flange.

6. The device claimed in claim 3, wherein a web axially extends the ring sectors beyond the strips in the direction towards the elastic sealing element 7. The device as claimed in claim 5, comprising a second strip substantially parallel to and axially spaced from the first-mentioned strip and integral with the web, the second strip being located axially on the opposite side of the flange to the first-mentioned strip at a distance from the first-mentioned strip which is substantially equal to the axial thickness of the flange.

8. The device claimed in claim 5, wherein the flange defines a radially inner surface and the mass of hardenable material is extended beyond the strip and interposed between the radially inner surface of the flange and the web.

9. The device claimed in claim 1, wherein another mass of hardenable material in the hardened state is disposed at the end of the male end portion between the male end portion and an inner surface of the second pipe element inwardly of the sealing element.

10. The device as claimed in claim 5, wherein said web further extends axially beyong the other side of said strip in the direction towards the elastic sealing element.

* * * * *